United States Patent [19]

Reichert et al.

[11] Patent Number: 4,615,918
[45] Date of Patent: Oct. 7, 1986

[54] COATING COMPOSITION AND PROCESS FOR PROTECTING A SURFACE FROM CORROSION

[75] Inventors: William W. Reichert, Freehold; Charles A. Cody, East Windsor; Michael A. De Sesa, Fair Haven; Bruce K. Faulseit, Mount Holly, all of N.J.

[73] Assignee: NL Industries, Inc., New York, N.Y.

[21] Appl. No.: 753,456

[22] Filed: Jul. 10, 1985

[51] Int. Cl.$^4$ .......................... B05D 3/02; C04B 9/02; C08K 3/00
[52] U.S. Cl. ............... 427/385.5; 106/14.05; 106/14.34; 106/14.39; 252/389.1; 252/389.24; 252/389.3; 252/389.4; 252/389.52; 252/389.54; 252/389.61; 252/396; 427/388.1
[58] Field of Search ............... 427/388.1, 388.2, 385.5; 106/14.05, 14.34, 14.39; 252/389.24, 389.3, 389.1, 389.4, 389.5, 389.54, 389.61, 396

[56] References Cited

U.S. PATENT DOCUMENTS

| | | | |
|---|---|---|---|
| 2,544,236 | 3/1951 | Reimert et al. | 252/301.6 |
| 2,579,020 | 12/1951 | Smith | 106/288 |
| 2,597,406 | 5/1952 | Thome-Johannesen | 148/6.15 |
| 3,558,273 | 1/1971 | Beck | 23/105 |
| 3,852,087 | 12/1974 | Nordyke et al. | 106/288 B |
| 3,869,299 | 3/1975 | Periard et al. | 106/306 |
| 3,923,712 | 12/1975 | Vickery | 106/296 X |
| 3,960,611 | 6/1976 | Walker et al. | 148/6.15 R |
| 3,996,142 | 12/1976 | White et al. | 252/8.1 |
| 4,159,207 | 6/1979 | Nuss | 106/296 X |
| 4,217,142 | 8/1980 | Mayne et al. | 106/14.36 |
| 4,469,521 | 9/1984 | Salensky | 106/296 |

Primary Examiner—Thurman K. Page
Attorney, Agent, or Firm—Burns, Doane, Swecker & Mathis

[57] ABSTRACT

A coating composition useful for increasing the corrosion resistance of a surface is provided. The composition comprises a coating material and an anti-corrosive agent comprised of a calcined mixture consisting essentially of magnesium oxide and zinc oxide with or without calcium oxide. The composition may also include a defined compound which can improve the corrosion resistance, and filler.

66 Claims, No Drawings

COATING COMPOSITION AND PROCESS FOR PROTECTING A SURFACE FROM CORROSION

BACKGROUND OF THE INVENTION

1. Field of the Invention

The present invention relates to a coating composition that includes a non-pigmentary anti-corrosive agent which protects a surface from corrosion and to a process of using the composition.

2. Description of the Prior Art

It is known in the art to provide materials in coating compositions which impart corrosion resistance to surfaces coated by the compositions. For example, in U.S. Pat. No. 3,846,148, there is disclosed composite pigments which are stated as having excellent corrosion inhibition and tannin absorptive properties. The composite pigments comprise an inert silicate mineral base pigment having adhered to the particles thereof and in intimate association therewith at least one additive compound which may be a basic or hydrated metal phosphate, phosphite, borate or chromate.

A different type of corrosion inhibiting pigment which may be used in an anti-corrosion paint is that set forth in U.S. Pat. No. 4,140,538. This type of pigment comprises about 50 to 70 mole % of an oxide of at least one metal selected from the group consisting of magnesium, calcium and zinc, about 70 to 30 mole % of $Fe_2O_3$ and up to 20 mole % of $Cr_2O_3$ and is formed by calcining the metal-containing compounds of materials yielding the metal oxides on calcination. Other illustrations of iron oxide-based anti-corrosive pigments may be found in U.S. Pat. No. 3,904,421, German Pat. Nos. 2,560,072, 2,560,073, 2,642,049 and 2,815,306 and Japanese Kokai Nos. 49-93414, 49-100107 and 50-12600.

Anti-corrosion pigments are also described in U.S. Pat. No. 4,156,613. The pigments are comprised of:

(a) about 30 to 70 mole percent of at least one of MgO, ZnO and CaO, and (b) about 70 to 30 mole percent of $Me_2O_3$ wherein $Me_2O_3$ has the approximate molar percent composition $Fe_2O_3$ 0–100 mole %, $Al_2O_3 + Mn_2O_3$ 0–100% and $Cr_2O_3$ 0–20 mole %.

An anti-corrosion paint is described in French Pat. No. 2,475,565. The paint contains 15 parts MgO with 100 parts of a 15% aqueous dispersion of polybutadiene as the active agents.

An indoor/outdoor wallpaint is described in French Pat. No. 1,506,784. The wallpaint contains carbon dioxide-free dolomite, silica gel, magnesium oxide and sodium chloride.

While unrelated to coating compositions, U.S. Pat. No. 4,360,624 describes a calcined solid solution of zinc oxide and magnesium oxide and/or calcium oxide which is added to a plastic composition as a smoke and/or fire retardent agent.

OBJECTS AND SUMMARY OF THE INVENTION

Accordingly, it is a general object of the present invention to provide a novel coating composition which increases the corrosion resistance of a surface to which it is applied.

It is a more specific object of the present invention to provide a coating composition which imparts excellent corrosion protection for a surface as determined by salt fog spray and outdoor exposure tests.

It is a further object of the present invention to provide a corrosion-resisting coating composition which has excellent shelf life and thermal stability.

It is a still further object of the present invention to provide a coating composition which imparts corrosion resistance to a surface and displays excellent blister resistance and film integrity.

It is a still further object of the present invention to provide a coating composition that exhibits excellent adhesion to a surface.

It is a still further object of the present invention to provide a coating composition which includes a non-pigmentary anti-corrosive agent that exhibits low oil adsorption.

It is a still further object of the present invention to provide a coating composition which contains a non-pigmentary anti-corrosive agent that does not require an iron oxide as an essential component.

It is a yet further object of the present invention to provide a process for imparting corrosion resistance to a surface.

In one aspect, the present invention provides a coating composition for protecting a surface from corrosion. The composition comprises:

(a) a coating material; and (b) a non-pigmentary anti-corrosive agent comprised of a calcined mixture consisting essentially of from about 5 to about 95% by weight of magnesium oxide and from about 5 to about 95% by weight of zinc oxide.

In another aspect, the present invention provides a coating composition for protecting a surface from corrosion. The composition comprises:

(a) a coating material; and (b) a non-pigmentary anti-corrosive agent comprised of a calcined mixture consisting essentially of (i) from about 5 to about 95% by weight of magnesium oxide and from about 5 to about 95% by weight of zinc oxide wherein the percentages are based on the total amount of (i), and (ii) calcium oxide wherein the amount of (i) is from about 10 to about 99 parts by weight and the amount of (ii) is from about 1 to about 90 parts by weight with the sum of the amounts of (i) and (ii) being 100 parts by weight.

In a further aspect, the present invention provides a process for protecting a surface from corrosion.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

As stated hereinabove, one aspect of the present invention relates to a coating composition for increasing the corrosion resistance of a surface wherein the coating composition (which is initially in liquid state) comprises a coating material and a non-pigmentary anti-corrosive agent (i.e., an agent which imparts corrosion resistance properties to the composition).

The coating material is present in the composition in an amount ranging from about 30 to about 99% by weight, preferably from about 50 to about 90% by weight of the overall liquid-state coating composition. The coating material may be any known organic solvent based material which is not deleteriously affected by the presence of the anti-corrosive agent. Typical coating materials include alkyd-based paints, oil/alkyd-based paints, vinyl-based paints, chlorinated rubber-based paints, epoxies, silicates, polyurethanes, acrylics, phenolics, polyesters and mixtures thereof. A further discussion of illustrative coating materials of which many are commercially available is set forth in the Federation Series on Coatings Technology, the contents of which are incorporated by reference.

Preferred coating materials are oleoresinous systems, exemplified by oil/alkyd systems, and chlorinated rubber systems. Oil/alkyd systems are generally based on a combination of a drying oil and an alkyd resin which is the reaction product of a polybasic acid, a polyhydric alcohol and a monobasic fatty acid or oil. Chlorinated rubber systems are based on a combination of an organic solvent, such as xylene, and the reaction product of rubber and chlorine. The most preferred coating material is oil/alkyd-based paints, particularly wherein the ratio of oil to alkyd resin is 1:1 by weight.

As is well known in the art, the coating materials decrease in weight upon drying due to the evaporation of the organic solvent. Typically, the loss in weight of the fully dried material is from about 10 to about 25% of the initial weight.

The non-pigmentary anti-corrosive agent used in the present invention is present in an amount ranging from about 1 to about 70%, preferably from about 10 to about 50% by weight of the liquid coating composition. In one aspect of the present invention, the anti-corrosive agent is a calcined mixture consisting essentially of magnesium oxide and zinc oxide. In a further aspect of the present invention, the anti-corrosive agent is a calcined mixture consisting essentially of magnesium oxide, zinc oxide and calcium oxide.

The non-pigmentary anti-corrosive agent of the present invention may be contrasted with anti-corrosive pigments known in the art. Such pigments, exemplified by $CaFe_2O_4$, $MgFe_2O_4$ and $ZnFe_2O_4$ are characterized by high hiding power, high tint strength and are highly colored. The non-pigmentary anti-corrosive agent of the present invention on the other hand is characterized by low hiding power, low tint strength and is essentially white. Thus, for example, the non-pigmentary anti-corrosive agent of the present invention will typically have a tint strength of less than about 10% (e.g., from about 5 to about 10%) of the tint strength of titanium dioxide as determined by ASTM method D2745-80 entitled "Instrumental Tinting Strength of White Pigments".

Due to the non-pigmentary characteristic of the anti-corrosive agent, additional colorants do not have to be added to the composition in order to mask the color of the anti-corrosive agent. This reduces the cost of the composition and can permit higher loadings of the anti-corrosive agent in the composition. It can therefore be understood that the anti-corrosive agent of the present invention is substantially free of amounts of iron oxide and other materials which will materially affect the pigmentary and anti-corrosive characteristics of the agent.

The amounts of magnesium oxide and zinc oxide in the calcined mixture is such that of the total weight of these components, from about 5 to about 95% by weight is magnesium oxide and from about 5 to about 95% by weight is zinc oxide. Preferably, from about 20 to about 80% by weight is magnesium oxide and from about 20 to about 80% by weight is zinc oxide and most preferably from about 50 to about 70% by weight is magnesium oxide and from about 30 to about 50% by weight is zinc oxide.

In that aspect of the present invention wherein calcium oxide is calcined with the magnesium oxide and zinc oxide, the total amount of magnesium oxide and zinc oxide is from about 10 to about 99 parts by weight and the total amount of the calcium oxide is from about 1 to about 90 parts by weight on a 100 parts by weight basis. The preferred amounts of the sum of magnesium oxide and zinc oxide with the calcium oxide generally depends on the coating composition in which it is to be used. For example, in oleoresinous systems, the preferred amount of the total weight of magnesium oxide and zinc oxide is from about 90 to about 98 parts by weight and the amount of calcium oxide is from about 2 to about 10 parts by weight on a 100 parts by weight basis. In chlorinated rubber systems, the amount of the total weight of magnesium oxide and zinc oxide is from about 25 to about 94 parts by weight and the total amount of calcium oxide is from about 6 to about 75 parts by weight on a 100 parts by weight basis.

Illustrative anti-corrosive agents of the present invention have the following compositions on a 100 parts basis:

(a) 95% by weight MgO and 5% by weight ZnO
(b) 80% by weight MgO and 20% by weight ZnO
(c) 60% by weight MgO and 40% by weight ZnO
(d) 95 parts by weight of which 60% by weight is MgO and 40% by weight is ZnO and 5 parts by weight of CaO
(e) 50 parts by weight of which 70% by weight is MgO and 30% by weight is ZnO and 50 parts by weight of CaO
(f) 25 parts by weight of which 60% by weight is MgO and 40% by weight is ZnO and 75 parts by weight is CaO Of the total amount of magnesium oxide, zinc oxide and calcium oxide, if present, up to about 10% (e.g., from about 1 to about 10%) by weight of at least one of these constituents may be replaced by at least one of molybdenum trioxide, barium oxide and strontium oxide in the mixture which is then calcined. Thus, for example, in a situation where there is 100 pounds of an anti-corrosive agent having composition (e), up to about 3.5 pounds of the MgO, up to about 1.5 pounds of the ZnO and/or up to about 5.0 pounds of the CaO can be replaced with at least one of the molybdenum trioxide, barium oxide and strontium oxide.

The anti-corrosive agent may be prepared by mixing zinc oxide and the calcium oxide, if present, into an aqueous magnesium hydroxide slurry or aqueous magnesium oxide slurry wherein the resulting mixture contains from about 10 to about 50% by weight of solids. The mixture can also be prepared by mixing the magnesium oxide, zinc oxide and calcium oxide, if present, into water in any order. The mixture is filtered, preferably at a slightly elevated temperature of from about 50° to about 90° C. to aid filtration, and the cake may be broken up and then calcined at a temperature and for a time such that the desired mixture is obtained. The mixture can also be prepard by dry blending the various components.

While temperatures up to about 1200° C. can be used, calcining is typically done from about 400° to about 1100° C., preferably from about 900° to about 1000° C., for a period of time ranging from between ½ to 8 hours. The calcining conditions are selected such that the resulting anti-corrosive agent exhibits anti-corrosive properties which are superior to the uncalcined mixture. For example, the filter cake or dry mixture can be calcined at about 950° C. for about 2 hours in order to obtain a suitable product. The product may then be milled (e.g., in a hammer mill) to obtain particles having an average diameter in the range of from about 0.2 to about 25 microns, preferably from about 1 to about 10 microns.

As should be apparent, other compounds containing the metals, such as metal hydroxides, metal carbonates and metal salts, which will result in the oxides in the calcined mixture can similarly be employed. For example, limestone or slaked lime may be used as a source of calcium oxide. Similarly, magnesium carbonate or magnesium hydroxide may be used as a source for magnesium oxide and zinc hydroxide or basic zinc carbonate may be used as a source for zinc oxide. A further discussion of techniques useful in the preparation of the calcined mixture may be found in aforementioned U.S. Pat. No. 4,360,624, the contents of which are incorporated by reference.

The calcined anti-corrosive agent of the present invention exhibits anti-corrosive and paint and paint film properties that are far superior from those obtained by mixing the same oxides in the same proportions, but without heating (i.e., calcining) them. Although applicants do not wish to be bound by any theory, it is believed that the zinc oxide dissolves into the magnesium oxide and forms a solid solution. On a molecular level, this can be described as an interpenetration of the magnesium oxide and zinc oxide crystal lattices. Evidence supporting this understanding are X-ray diffraction patterns of mixtures calcined above about 900° C. which show a decrease in the intensity of the peaks due to zinc oxide and a shift in the atomic spacing of the magnesium oxide lattice which indicates the presence of a zinc oxide/magnesium oxide solid solution. In the event that calcium oxide is present, it is further believed that the calcium oxide becomes incorporated into the magesium oxide and zinc oxide lattices and the magnesium oxide and zinc oxide similarly is incorporated into the calcium oxide lattice. Although X-ray diffraction patterns of mixtures calcined at lower temperatures (e.g., about 450° C.) do not clearly show this phenomenon, it is nonetheless probably occurring albeit to a lesser extent.

In addition to the coating material and the anti-corrosive agent, the coating composition may additionally contain at least one compound formed from a divalent, trivalent or tetravalent metal cation and an anion selected from phosphates, phosphites, borates, borophosphates, borophosphites and mixtures thereof. Preferred compounds are calcium phosphate, calcium borate, calcium phosphite, zinc phosphite, zinc phosphate, zinc borate, magnesium phosphite and mixtures thereof. The most preferred compound is crystalline calcium phosphite. The presence of these uncalcined compounds improves the anti-corrosion activity of the coating composition and particularly helps suppress spot rusting.

The compound is a substitute for from about 1 to about 40%, preferably from about 10 to about 25% of the calcined anti-corrosive agent. Thus, for example, in 100 lbs of a coating composition which contains 40 lbs. of the calcined anti-corrosive agent, up to about 16 lbs. of the calcined anti-corrosive agent can be replaced with at least one of the defined compounds. In a further example, the anti-corrosive agent may be a calcined mixture of 95 parts by weight of magnesium oxide (60%) and zinc oxide (40%) and 5 parts by weight of calcium oxide which is used with crystalline calcium phosphite in a ratio of 4:1. The same ratio may be used with a similar anti-corrosive agent which is prepared from the same percentages of magnesium and zinc oxide without the presence of calcium oxide.

The compound may be directly incorporated into the coating composition or may be first dry blended with the anti-corrosive agent which blend is then added to the coating composition.

Additionally, up to about 10% (e.g., from about 1 to about 10%) by weight of the anti-corrosive agent can be substituted with at least one of molybdenum trioxide, strontium oxide, barium oxide and calcium oxide in the uncalcined state.

To the coating composition may also be added fillers which may or may not have pigmentary properties. Such fillers are exemplified by talc, silica, barium sulfate, calcium sulfate, calcium carbonate, calcium silicate, titanium dioxide, iron oxides, mica, aluminum silicate, clay and mixtures thereof. The preferred extenders are calcium carbonate, iron oxides, titanium dioxide, talc and mixtures thereof.

The fillers are present in an amount ranging from about 1 to about 69% by weight, preferably from about 15 to about 35% by weight of the liquid coating composition with the proviso that the total amount of (1) the anti-corrosive agent, (2) the uncalcined compound (if any is present) which can partly be a substitute for the anti-corrosive agent and (3) the filler should not exceed about 70% by weight of the total composition. However, the amount of this filler does not include the amount of filler which may already be present in the coating material such as those commercially available.

The fillers may be separately added to the coating composition or may be wet or dry blended with the anti-corrosive agent before it is added to the composition or may be wet or dry blended with the components forming the anti-corrosive agent before they are activated by calcining. However, as indicated above, substantial amounts of iron oxides or other materials which would materially affect the non-pigmentary and anti-corrosive characteristics of the agent cannot be present during calcination of the components forming the anti-corrosive agent.

The coating composition of the present invention may further include other known materials, such as driers, anti-oxidants, gellants, solvents, fungicides, etc. in known amounts suitable for their intended function. Thus, for example, an organic salt (e.g., an octoate or naphthenate) of a metal (e.g., cobalt, calcium, zirconium, manganese, lead, bismuth or antimony) available from Nuodex Corporation under the name "Nuxtra" can be used as a drier in order to catalyze the oxidative polymerization of unsaturated prepolymers. Similarly, an anti-oxidant, such as methyl ethyl ketoxime available under the name "Eskin No. 2" from Nuodex Corporation, can be added to prevent surface oxidation in the coating composition.

To prepare the coating composition, the anti-corrosive agent can be first wet (i.e., with a small amount of organic solvent) or dry blended for a sufficient period of time (e.g., up to about 2 hours) with the other materials (e.g., the filler and/or additional compound and/or other conventional components) and this mixture may then be mixed into the coating material. Alternatively, the anti-corrosive agent may be added to the coating material separate from the other components in any order of addition.

The surfaces to which the coating composition may be applied may be composed of any material or combination of materials which are subjected to an environment in which they will eventually corrode. Typical materials include metallic surfaces especially ferrous metal surfaces exemplified by hot rolled steel, cold rolled steel, galvanized iron and mixtures thereof. Such materials are commonly used in outdoor environments wherein they are exposed to rain, wind and sun and, if near bodies of salt water, may also be exposed to salt water spray. Similar high-humidity or otherwise aggressive atmospheres may also be found in certain indoor environments.

The coating compositions of the present invention are applied to the aforementioned surfaces and are permitted to dry to obtain a thickness in the range of from about 0.5 to about 20 mils preferably from about 1 to about 10 mils. Due to the presence of the anti-corrosive agent, the dried coating provides excellent corrosion protection for the surfaces when they are exposed to salt fog sprays and other outdoor exposure tests. Additionally, the anti-corrosive agents have low oil absorption and therefor can be heavily loaded into the composition and can be prepared in sufficiently small particle size to be readily incorporated into coating materials via standard mixing techniques. The resulting compositions display a long shelf life and have excellent heat stability. The coating compositions additionally display excellent blister resistance and film integrity.

The degree of anti-corrosion performance of the coating composition of the present invention can be measured by two standard ASTM methods, namely ASTM D610-68 entitled "Evaluating Degree of Rusting on Painted Steel Surfaces" and ASTM D714-56 entitled "Evaluating Degree of Blistering of Paints." The coating composition can also be tested in accordance with ASTM method B117-73 entitled "Method of Salt Spray (Fog) Testing" wherein the composition is applied onto steel panels which are scribed and subjected to salt fog spray. Scribing is achieved by scratching an "X" in the coating through to bare steel using a tungsten carbide cutting tool. The amount of corrosion at the scribe is assessed on a scale of 1–10 where 10 is no corrosion and 1 is complete failure where the whole area associated with the scribe is rusting. Ratings of 5 and above are acceptable for anti-corrosive compositions. An oil/alkyd coating which does not contain an anti-corrosive agent will deteriorate to a 1 rating within 300 hours of salt fog exposure.

Rust ratings may also be done on the unscribed area of the coated panel.

Blistering in the coatings is assessed in accordance with ASTM D714-56. This method describes blister size as numbers 2, 4, 6, 8, and 10, where 2 is a large blister, ¼ inch or larger in diameter, 8 is a small blister less than 1/16 inch in diameter and 10 is the absence of blistering. Blister density is described as D=dense, MD=medium dense, M=medium, and F=few. Blister rating of worse than 6F are generally regarded as unacceptable in anti-corrosive compositions.

Oil absorption is measured according to ASTM 281-31 entitled "Oil Absorption of Pigments by Spatula Rub-Out". Anti-corrosive agents with higher oil absorption values require more oil to wet a given weight of anti-corrosive agent. Anti-corrosive agent with low oil absorption values can be loaded at higher levels (i.e., more weight of anti-corrosive agent can be added to a coating composition) than anti-corrosive agents having high oil absorption.

Adhesion is measured according to ASTM D3359-83 entitled "Measuring Adhesion by Tape Test". The coating composition with anti-corrosive agent is exposed to salt fog spray according to ASTM B117-73 for 400 hours, then allowed to dry. In the tape adhesion test (Method B) a perfect rating is 5 on a scale of 0–5, where 0=complete delamination and 5=no delamination.

Thermal stability can be analyzed according to ASTM method D1849-74 entitled "Package Stability of Paint". In the method, the coating composition is stored at 140° F. for two weeks and observed to determine whether a significant viscosity increase or pigment settling occurs. For example, an oil/alkyd composition containing 50% by weight of the anti-corrosive agent shows a 6% increase in Stormer viscosity (ASTM D562-81 entitled "Consistency of Paints Using the Stormer Viscometer") as compared to a 6% Stormer viscosity increase for an oil/alkyd composition containing 50% by weight of an inert filler magnesium silicate and a 7% increase in Stormer viscosity for an oil/alkyd composition containing 50% by weight of calcium borosilicate as an anti-corrosive agent. Similarly, storage at room temperature (70° F.) for 3 months (shelf stability evaluation) shows that the same coating composition has good package stability showing a 3% Stormer viscosity increase as compared to a 3% increase for magnesium silicate and a 4% increase for calcium borosilicate.

Having thus been disclosed, the present invention is exemplified in the following examples. It is to be understood, however, that the present invention is not to be limited to the specifics thereof.

EXAMPLE 1

A reaction vessel constructed of stainless steel and fitted with a mechanical stirrer is charged with 2200 grams of water. To the water is added 600 grams of magnesium oxide and 400 grams of zinc oxide at room temperature. After the slurry is stirred at room temperature for 30 minutes, the solids are filtered under vacuum. The filter cake is dried in an oven at 120° C. for 18 hours. The dried filter cake is broken up and calcined in a ceramic tray in an oven at 950° C. for 2 hours. After cooling, the solid solution product is hammer milled through a 0.02 inch screen to break up the agglomerates.

The milled anti-corrosive agent is added to a standard 1:1 oil/alkyd paint formulation and a salt fog evaluation (ASTM Method B117-73) is conducted using this agent to demonstrate its anti-corrosive properties. These results are summarized in Table 1.

In these salt fog tests, the 1:1 oil/alkyd paint formulation is prepared using the following formula:

| | 1:1 Oil/Alkyd White Primer | | |
|---|---|---|---|
| INGREDIENT | GENERIC NAME | MANUFACTURER | FORMULATION (pounds) |
| Aroplaz 1266M70 (70% solids) | Alkyd resin | Spencer Kellog | 221.0 |
| Mineral Spirits | Solvent | Ashland | 127.0 |
| Anti-corrosive Agent | | | 200.0 |
| Titanox 2101 | Titanium dioxide | NL Industries | 250.0 |
| Nytal 300 | Talc | R. T. Vanderbilt | 273.0 |

-continued

| | 1:1 Oil/Alkyd White Primer | | |
|---|---|---|---|
| INGREDIENT | GENERIC NAME | MANUFAC-TURER | FORMU-LATION (pounds) |
| Bentone SD-1 | Organo-philic clay | NL Industries | 7.0 |
| Raw Linseed Oil | Raw lin-seed oil | Spencer Kellogg | 165.5 |
| 6% Zirconium Nuxtra | Drier | Nuodex | 8.5 |
| 6% Manganese Nuxtra | Drier | Nuodex | 2.3 |
| 6% Cobalt Nuxtra | Drier | Nuodex | 1.5 |
| Eskin No. 2 | Anti-skin-ning agent | Nuodex | 1.5 |

EXAMPLE 2

The reaction vessel used in Example 1 is charged with 2200 grams of water. To the water is added 600 grams of magnesium oxide and 400 grams of zinc oxide at room temperature. After the slurry is stirred at room temperature for 30 minutes, the solids are filtered under vacuum. The filter cake is dried in an oven at 120° C. for 18 hours. The dried filter cake is broken up and calcined in a ceramic tray in an oven at 450° C. for 2 hours. After cooling, the solid solution product is hammer milled through a 0.02 inch screen to break up the agglomerates.

The anti-corrosive agent is added to the standard 1:1 oil/alkyd paint formulation described above and a salt fog evaluation is performed. The results are summarized in Table 1.

COMPARATIVE EXAMPLE A

The reaction vessel used in Example 1 is charged with 2200 grams of water. To the water is added 600 grams of magnesium oxide and 400 grams of zinc oxide at room temperature. After the slurry is stirred at room temperature for 30 minutes, the solids are filtered under vacuum. The filter cake is dried in an oven at 120° C. for 18 hours. The dried cake is broken up and hammer milled through a 0.02 inch screen to break up the agglomerates.

This comparative anti-corrosive agent is added to the standard 1:1 oil/alkyd paint formulation described above and a salt fog evaluation is performed. The results are summarized in Table 1.

EXAMPLE 3

Six pounds of magnesium oxide and 4 pounds of zinc oxide are dry mixed thoroughly in a Patterson-Kelly blender. The mixture is placed in a rotary calciner and slowly tumbled throughout the calcination step. The mixture is heated to 950° C. and calcined at that temperature for 2 hours. After the calcination, the calcined mixture is allowed to cool and is broken up and hammer milled through a 0.2 inch screen to break up the agglomerates.

The anti-corrosive agent is added to the standard 1:1 oil/alkyd paint formulation described above and a salt fog evaluation is performed. The results are summarized in Table 1.

EXAMPLE 4

A reaction vessel constructed of stainless steel and fitted with a mechanical stirrer is charged with 2000 ml of water and 1.5 grams of Tamol 731 (which is a dispersant that is a sodium salt of polymeric carboxylic acid available from Rohm and Haas Company). To this homogeneous mixture is added 338.4 grams of magnesium oxide, 225.6 grams of zinc oxide, and 64.1 grams of calcium carbonate at room temperature. After the slurry is stirred at room temperature for 30 minutes, the solids are filtered under vacuum. The filter cake is dried in an oven at 120° C. for 18 hours. The dried filter cake is broken up and calcined in a ceramic tray in an oven at 950° C. for 2.5 hours. After cooling, the solid solution product is hammer milled through a 0.02 inch screen to break up the agglomerates.

180 grams of the anti-corrosive agent is dry blended with 120 grams of pigmentary grade calcium carbonate to give an extender loading level of 40% in the final composition.

The anti-corrosive agent is added to the standard 1:1 oil/alkyd paint formulation described above and a salt fog evaluation is conducted using this product to demonstrate its anti-corrosive properties. The results are summarized in Table 1.

EXAMPLE 5

The reaction vessel used in Example 4 is charged with 2000 ml of water and 2.5 grams of Tamol 731. To this homogeneous mixture is added 600 grams of magnesium oxide and 400 grams of zinc oxide at room temperature. After the slurry is stirred at room temperature for 30 minutes, the solids are filtered under vacuum. The filter cake is dried in an oven at 120° C. for 18 hours. The dried filter cake is broken up and calcined in a ceramic tray in an oven at 950° C. for 2.5 hours. After cooling, the solid solution product is hammer milled through a 0.02 inch screen to break up the agglomerates.

120 grams of the anti-corrosive agent is dry blended with 60 grams of pigmentary grade calcium carbonate and 60 grams of finely ground calcium phosphite to yield extender and salt loading levels of 20% and 20%, respectively.

The anti-corrosive agent is added to the standard 1:1 oil/alkyd formulation described above and a salt fog evaluation is conducted on cold-rolled steel panels using this product to demonstrate its anti-corrosion and other properties. These results are summarized in Tables IA and IB.

TABLE IA

| SALT FOG EXPOSURE RESULTS (575 HOURS) | | | | | |
|---|---|---|---|---|---|
| | Blistering | | Rusting | | |
| Sample Description | Scribe | Panel | Scribe | Panel | Adhesion |
| Example 1 | 10 | 10 | 5 | 10 | 5 |
| Example 2 | 10 | 10 | 5 | 10 | 5 |
| Comparative Example A | 8F | 10 | 5 | 10 | 3 |
| Example 3 | 8F | 10 | 5 | 10 | 5 |
| Example 4 | 8F | 8F | 7 | 9 | 5 |
| Example 5 | 6F | 8F | 7 | 10 | 5 |
| Halox CW-291* | 8F | 8M | 6 | 10 | 4 |
| Nalzin 2** | 2D | 8D | 3 | 10 | 3 |

TABLE IB

| Sample Description | Oil Absorption | Initial Viscosity | Heat Stability | Shelf Stability (3 months) |
|---|---|---|---|---|
| Example 1 | 25.0 | 100 KU | 102 KU | 104 KU |
| Example 2 | 28.7 | 100 KU | 100 KU | 103 KU |
| Comparative Example A | 22.4 | 85 KU | 88 KU | 89 KU |
| Example 3 | 24.0 | 100 KU | 102 KU | 103 KU |
| Example 4 | 14.9 | 70 KU | 75 KU | 72 KU |

TABLE IB-continued

| Sample Description | Oil Absorption | Initial Viscosity | Heat Stability | Shelf Stability (3 months) |
|---|---|---|---|---|
| Example 5 | 16.8 | 70 KU | 74 KU | 72 KU |
| Halox CW-291* | 25.0 | 80 KU | 93 KU | 86 KU |
| Nalzin 2** | 16.0 | 82 KU | 84 KU | 82 KU |

*Halox CW-291 is a proprietary anti-corrosive agent based on calcium borosilicate available from the Halox Pigments Division of Hammond Lead Products, Inc.
**Nalzin 2 is a proprietary anti-corrosive agent based on zinc hydroxy phosphite complex available from NL Industries.

EXAMPLE 6

Two 1:1 oil/alkyd maintenance primer formulations are prepared. Formulation 1 is prepared using the ingredients identified in Table II which are mixed as indicated in the order in which they appear. The anti-corrosive pigment employed in this formulation is [(MgO(56.4)/ZnO(37.6)/CaO(6)] calcined at 950° C. for 2.5 hours. The anti-corrosive agent is extended with $CaCO_3$ in a 60:40 weight ratio, respectively, and prepared in accordance with the technique of Example 4.

Formulation 2 is prepared in the same manner as formulation 1 except that the anti-corrosive pigment employed is Halox CW-291. Formulation 2 is provided for comparative purposes.

The properties of formulations 1 and 2 are tested in accordance with the procedures:

| Test | ASTM Method |
|---|---|
| Fineness of Grind | D1210-78 |
| Salt Fog Exposure | B117-73 |
| Rusting | D610-68 |
| Blistering | D716-56 |
| Stability | D1849-74* |

*cycle used in this test is 10 days at 140° F.

The test results obtained from formulations 1 and 2, using the aforementioned test methods on cold-rolled steel panels, are listed in Table III.

TABLE III

1:1 OIL/ALKYD RED PRIMER

| | Formulation Nos. | |
|---|---|---|
| Paint Property | (1) | (2) |
| Initial Viscosity | 74 KU | 83 KU |
| Fineness of Grind | 4 A | 4.5 A |
| Heat Stability | 78 KU | 94 KU |
| Salt Fog Exposure Results (750 hrs.) | 8 | 3 |
| Rusting | 8 | 3 |
| Blistering | 6 F | 4 M |

EXAMPLE 7

Two chlorinated rubber primer formulations are prepared. Formulation 1 is prepared using the ingredients identified in Table IV which are mixed as indicated in the order in which they appear. The anti-corrosive pigment employed in this formulation is [(MgO(56.4)/ZnO(37.6)/CaO(6)] calcined at 950° C. for 2.5 hours. The anti-corrosive agent is extended with $CaCO_3$ in a 60:40 weight ratio, respectively, and prepared in accordance with the technique of Example 4.

Formulation 2 is prepared in the same manner as formulation 1 except that the anti-corrosive pigment employed is a mixture of zinc phosphate and zinc oxide and the amount of Barimite filler was increased to maintain a constant pigment volume concentration.

Formulation 2 is provided for comparative purposes.

The properties of formulations 1 and 2 are tested on cold-rolled steel panels in accordance with the procedures:

| Test | ASTM Method |
|---|---|
| Fineness of Grind | D1210-78 |
| Salt Fog Exposure | B117-73 |
| Rusting | D610-68 |
| Blistering | D716-56 |
| Stability | D1849-74* |

*cycle used in this test is 10 days at 140° F.

The test results obtained from formulations 1 and 2, using the aforementioned test methods, are listed in Table V.

TABLE II

1:1 OIL/ALKYD RED PRIMER

| | | | Formulation | |
|---|---|---|---|---|
| Ingredient | Generic Name | Manufacturer | (1) Pounds | (2) Pounds |
| Aroplaz 1266M70 | Alkyd resin | Spencer Kellogg | 210.0 | 210.0 |
| Amsco 66/3 | Mineral spirits | Union Oil | 26.0 | 26.0 |
| | Anti-corrosive agent | | 524.0 | — |
| Halox CW-291 | Anti-corrosive pigment | Halox | — | 524.0 |
| Nytal 300 | Talc | R. T. Vanderbilt | 146.0 | — |
| Pfizer 2899 | Red iron oxide | Pfizer | 116.0 | 116.0 |
| Bentone SD-1 | Organophilic clay | NL Industries | 12.0 | 12.0 |
| Disperse for 15 Minutes at High Speed to obtain a Hegman Gauge Reading of 4 N.S. | | | | |
| Raw Linseed Oil | Raw linseed oil | Spencer Kellogg | 147.0 | 147.0 |
| Amsco 66/3 | Mineral spirits | Union Oil | 127.0 | 127.0 |
| 6% Cobalt Nuxtra | Drier | Nuodex | 2.6 | 2.6 |
| 4% Calcium Nuxtra | Drier | Nuodex | 14.0 | 14.0 |
| 6% Zirconium Nuxtra | Drier | Nuodex | 9.4 | 9.4 |
| Eskin No. 2 | Anti-skinning agent | Nuodex | 1.8 | 1.8 |

TABLE IV

| Ingredient | Generic Name | Manufacturer | Formulation 1 Pounds | Formulation 2 Pounds |
|---|---|---|---|---|
| Prepare chlorinated rubber solution separately by mixing at high speed: | | | | |
| Xylene | Xylene | Exxon Corporation | 452.0 | 452.0 |
| Parlon S10 | Chlorinated Rubber | Hercules | 180.0 | 180.0 |
| ADD IN ORDER SHOWN: | | | | |
| As Above | Chlorinated Rubber Solution | — | 330.0 | 330.0 |
| Cereclor 70L | Plasticizer | I.C.I. | 30.0 | 30.0 |
| Cereclor 42P | Plasticizer | I.C.I. | 60.0 | 60.0 |
| Bentone 34 | Rheological Additive | NL Industries | 4.0 | 4.0 |
| Thixatrol ST | Rheological Additive | NL Industries | 3.0 | 3.0 |
| Mix: | | | | |
| 95/5 Methanol/Water | Polar Activator | Ashland | 1.3 | 1.3 |
| Mix: | | | | |
| Nuosperse 700 | Wetting Agent | Nuodex | 8.0 | 8.0 |
| Azo 3% | Zinc Oxide | Asarco | | 100.0 |
| Zinc Phosphate | Zinc Phosphate Anti-corrosive agent | BASF | 200.0 | 100.0 |
| Nytal 300 | Talc, 5.5 u | RT Vanderbilt | 20.0 | 20.0 |
| Red Iron Oxide R5098 | Red Iron Oxide, 5.5 u | Pfizer | 60.0 | 60.0 |
| Barimite | Barytes, 4.5 u | Thibout-Walker | 70.9 | 97.8 |
| 325 Water Ground Mica | Mica, 25.0 u | English Mica | 40.0 | 40.0 |
| DISPERSE; MAINTAIN TEMPERATURE AT 110° F./43° C. to 125° F./51° C. FOR 15 MINUTES, THEN ADD: | | | | |
| Aroplaz 1271 | Alkyd Resin | Spencer Kellogg | 30.0 | 30.0 |
| 6% Zr Nuxtra | Drier | Nuodex | 2.0 | 2.0 |
| 6% Co Nuxtra | Drier | Nuodex | 0.5 | 0.5 |
| As above | Chlorinated Rubber Solution | | 302.0 | 302.0 |
| Propylene Oxide | Propylene Oxide | Union Carbide | 1.0 | 1.0 |
| | | | 1162.7 | 1189.6 |

TABLE V

Red Chlorinated Rubber Primer

| Paint Property | Formulation Nos. (1) | Formulation Nos. (2) |
|---|---|---|
| Initial Viscosity | 78 | 78 |
| Fineness of Grind | 4 A | 4 A |
| Heat Stability | 85 | 82 |
| Salt Fog Exposure Results (1000 hours) Rusting | 10 | 8 |
| Blistering | 8 F | 6 M |

The invention being thus described and exemplified, it will be obvious that the invention may be varied in many ways. Such variations are not to be regarded as a departure from the spirit and scope of the invention and all such modifications are intended to be included within the scope of the following claims.

What is claimed is:

1. A coating composition for protecting a surface from corrosion comprising:
   (a) from about 30 to about 99% by weight of an organic solvent based coating material; and
   (b) from about 1 to about 70% by weight of non-pigmentary anti-corrosive agent comprised of a calcined mixture consisting essentially of from about 5 to about 95% by weight of magnesium oxide and from about 5 to about 95% by weight of zinc oxide.

2. The coating compositon of claim 1 wherein the coating material is an oleoresinous system or a chlorinated rubber system.

3. The coating composition of claim 2 wherein the coating material is an oil/alkyd paint.

4. The coating composition of claim 1 wherein the coating material is present in an amount ranging from about 50 to about 90% by weight of the composition.

5. The coating composition of claim 1 wherein the non-pigmentary anti-corrosive agent is present in an amount ranging from about 10 to about 50% by weight of the coating composition.

6. The coating composition of claim 1 wherein the calcined mixture consists essentially of from about 20 to about 80% by weight of magnesium oxide and from about 20 to about 80% by weight of zinc oxide.

7. The coating composition of claim 1 wherein the calcined mixture consists essentially of from about 50 to about 70% by weight of magnesium oxide and from about 30 to about 50% by weight of zinc oxide.

8. The coating composition of claim 1 wherein from about 10 to about 25% by weight of the non-pigmentary anti-corrosive agent is substituted with at least one compound formed from a divalent, trivalent or tetravalent metal cation and an anion selected from phosphates, phosphites, borates, borophosphates, borophosphites and mixtures thereof.

9. The coating composition of claim 8 wherein the compound is selected from the group consisting of calcium phosphate, calcium borate, calcium phosphite, zinc phosphite, zinc phosphate, zinc borate, magnesium phosphite and mixtures thereof.

10. The coating composition of claim 9 wherein the compound is crystalline calcium phosphite.

11. The coating composition of claim 1 wherein the coating composition further comprises from about 1 to about 69% by weight of a filler wherein the total amount of non-pigmentary anti-corrosive agent and filler is less than about 70% by weight of the coating composition.

12. The coating composition of claim 11 wherein the filler is selected from the group consisting of talc, silica, barium sulfate, calcium sulfate, calcium carbonate, calcium silicate, titanium dioxide, iron oxides, mica, aluminum silicate, clay and mixtures thereof.

13. The coating composition of claim 1 wherein from about 1 to about 10% by weight of the non-pigmentary anti-corrosive agent is substituted with an uncalcined compound selected from the group consisting of molybdenum trioxide, strontium oxide, barium oxide, calcium oxide and mixtures thereof.

14. A coating composition for increasing the corrosion resistance of a surface, said compositon comprising:
(a) from about 30 to about 99% by weight of an organic solvent based coating material; and
(b) from about 1 to about 70% by weight of non-pigmentary anti-corrsive agent comprised of a calcined mixture consisting essentially of
(i) from about 5 to about 95% by weight of magnesium oxide and from about 5 to about 95% by weight of zinc oxide wherein the percentages are based on the total amount of (i), and
(ii) calcium oxide
wherein the amount of (i) is from about 25 to about 99 parts by weight and the amount of (ii) is from about 1 to about 75 parts by weight with the sum of the mounts of (i) and (ii) being 100 parts by weight.

15. The coating composition of claim 14 wherein the coating material is present in an amount ranging from about 50 to about 90% by weight of the composition.

16. The coating composition of claim 14 wherein the coating material is an oleoresinous system or a chlorinated rubber system.

17. The coating composition of claim 16 wherein the coating material is an oleoresinous system and wherein the calcined mixture consists essentially of from about 90 to about 98 parts of (i) and from about 2 to about 10 parts of (ii).

18. The coating composition of claim 17 wherein the coating material is an oil/alkyd paint.

19. The coating composition of claim 16 wherein the coating material is a chlorinated rubber system and wherein the calcined mixture consists essentially of from about 25 to about 94 parts of (i) and from 6 to about 75 parts of (ii).

20. The coating composition of claim 14 wherein the non-pigmentary anti-corrosive agent is present in an amount varying from about 10 to about 50% by weight of the coating composition.

21. The coating composition of claim 14 wherein the calcined mixture consists essentially of from about 20 to about 80% by weight of magnesium oxide and from about 20 to about 80% by weight of zinc oxide.

22. The coating composition of claim 14 wherein the calcined mixture consists essentially of from about 50 to about 70% by weight of magnesium oxide and from about 30 to about 50% by weight of zinc oxide.

23. The eoating composition of claim 14 wherein from about 10 to about 25% by weight of the non-pigmentary anti-corrosive agent is substituted with at least one compound formed from a divalent, trivalent or tetravalent metal cation and an anion selected from phosphates, phosphites, borates, borophosphates, borophosphites and mixtures thereof.

24. The coating composition of claim 23 wherein the compound is selected from the group consisting of calcium phosphate, calcium borate, calcium phosphite, zinc phosphite, zinc phosphate, zinc borate, magnesium phosphite and mixtures thereof.

25. The coating composition of claim 24 wherein the compound is crystalline calcium phosphite.

26. The coating composition of claim 14 wherein the coating composition further comprises from about 1 to about 69% by weight of a filler wherein the total amount of non-pigmentary anti-corrosive agent and filler is less than about 70% by weight of the coating composition.

27. The coating composition of claim 26 wherein the filler is selected from the group consisting of talc, silica, barium sulfate, calcium sulfate, calcium carbonate, calcium silicate, titanium dioxide, iron oxides, mica, aluminum silicate, clay and mixtures thereof.

28. The coating composition of claim 27 wherein the filler is calcium carbonate.

29. The coating composition of claim 14 wherein from about 1 to about 10% by weight of the non-pigmentary anti-corrosive agent is substituted with an uncalcined compound selected from the group consisting of molybdenum trioxide, strontium oxide, barium oxide, calcium oxide and mixtures thereof.

30. A process for protecting a surface from corrosion comprising:
(a) coating the surface with a coating composition comprising
(i) from about 30 to about 99% by weight of an organic solvent based coating material; and
(ii) from about 1 to about 70% by weight of non-pigmentary anti-corrosive agent comprised of a calcined mixture consisting essentially of from about 5 to about 95% by weight of magnesium oxide and from about 5 to about 95% by weight of zinc oxide; and
(b) permitting the coating composition to dry.

31. The process of claim 30 wherein the dried coating composition has a thickness in the range of from about 0.5 to about 20 mils.

32. The process of claim 31 wherein the dried coating composition has a thickness in the range of from about 1 to about 10 mils.

33. The process of claim 30 wherein dried coating composition exhibits a weight loss of from about 10 to about 25% upon drying.

34. A process for protecting a surface from corrosion comprising:
(a) coating the surface with a coating composition comprising
(i) from about 30 to about 99% by weight of an organic solvent based coating material; and
(ii) from about 1 to about 70% by weight of non-pigmentary anti-corrosive agent comprised of a calcined mixture consisting essentially of
(1) from about 5 to about 95% by weight of magnesium oxide and from about 5 to about 95% by weight of zinc oxide wherein the percentages are based on a total amount of (1), and
(2) calcium oxide
wherein the amount of (1) is from about 25 to about 99 parts by weight and the amount of (2) is from about 1 to about 75 parts by weight with the sum of the amounts of (1) and (2) being 100 parts by weight; and
(b) permitting the coating compostion to dry.

35. The process of claim 34 wherein the dried coating composition has a thickness in the range of from about 0.5 to about 20 mils.

36. The process of claim 35 wherein the dried coating composition has a thickness in the range of from about 1 to about 10 mils.

37. The process of claim 34 wherein dried coating composition exhibits a weight loss of from about 10 to about 25% upon drying.

38. A coating composition for protecting a surface from corrosion comprising:
(a) from about 30 to about 99% by weight of an organic solvent based coating material; and
(b) from about 1 to about 70% by weight of non-pigmentary anti-corrosive agent comprised of a calcined mixture consisting essentially of from about 5 to about 95% by weight of magnesium oxide and from about 5 to about 95% by weight of zinc oxide and wherein up to about 10% by weight of the amount present of at least one of the magnesium oxide and zinc oxide is replaced with at least one of molybdenum oxide, barium oxide and strontium oxide.

39. The coating composition of claim 38 wherein the coating material is an oleoresinous system or a chlorinated rubber system.

40. The coating composition of claim 39 wherein the coating material is an oil/alkyd paint.

41. The coating composition of claim 38 wherein the coating material is present in an amount ranging from about 50 to about 90% by weight of the composition.

42. The coating composition of claim 38 wherein the non-pigmentary anti-corrosive agent is present in an amount ranging from about 10 to about 50% by weight of the coating composition.

43. The coating composition of claim 38 wherein the amount of magnesium oxide is from about 20 to about 80% by weight and the amount of zinc oxide is from about 20 to about 80% by weight.

44. The coating composition of claim 38 wherein the amount of magnesium oxide is from about 50 to about 70% by weight and the amount of zinc oxide is from about 30 to about 50% by weight.

45. The coating composition of claim 38 wherein from about 10 to about 25% by weight of the non-pigmentary anti-corrosive agent is substituted with at least one compound formed from a divalent, trivalent or tetravalent metal cation and an anion selected from phosphates, phosphites, borates, borophosphates, borophosphites and mixtures thereof.

46. The coating composition of claim 45 wherein the compound is selected from the group consisting of calcium phosphate, calcium borate, calcium phosphite, zinc phosphite, zinc phosphate, zinc borate, magnesium phosphite and mixtures thereof.

47. The coating composition of claim 46 wherein the compound is crystalline calcium phosphite.

48. The coating composition of claim 38 wherein the coating composition further comprises from about 1 to about 69% by weight of a filler wherein the total amount of non-pigmentary anti-corrosive agent and filler is less than about 70% by weight of the coating composition.

49. The coating composition of claim 48 wherein the filler is selected from the group consisting of talc, silica, baruim sulfate, calcium sulfate, calcium carbonate, calcium silicate, titanium dioxide, iron oxides, mica, aluminum silicate, clay and mixtures thereof.

50. The coating composition of claim 38 wherein from about 1 to about 10% by weight of the non-pigmentary anti-corrosive agent is substituted with an uncalcined compound selected from the group consisting of molybdenum trioxide, strontium oxide, barium oxide, calcium oxide and mixtures thereof.

51. A coating composition for protecting a surface from corrosion, said composition comprising:

(a) from about 30 to about 99% by weight of an organic solvent based coating material; and
(b) from about 1 to about 70% by weight of non-pigmentary anti-corrosive agent comprised of a calcined mixture consisting essentially of
  (i) from about 5 to about 95% by weight of magnesium oxide and from about 5 to about 95% by weight of zinc oxide wherein the percentages are based on total amount of (i), and
  (ii) calcium oxide wherein the amount of (i) is from about 25 to about 99 parts by weight and the amount of (ii) is from about 1 to about 75 parts by weight with the sum of the amounts of (i) and (ii) being 100 parts by weight and wherein up to about 10% by weight of the amount present of at least one of the magnesium oxide, zinc oxide and calcium oxide is replaced with at least one of molybdenum oxide, barium oxide and strontium oxide.

52. The coating composition of claim 51 wherein the coating material is present in an amount ranging from about 50 to about 90% by weight of the composition.

53. The coating composition of claim 51 wherein the coating material is an oleoresinous system or a chlorinated rubber system.

54. The coating composition of claim 51 wherein the coating material is an oleoresinous system and wherein the amount of (i) is from about 90 to about 98 parts of (i) and the amount of (ii) is from about 2 to about 10 parts.

55. The coating composition of claim 54 wherein the coating material is an oil/alkyd paint.

56. The coating composition of claim 53 wherein the coating material is a chlorinated rubber system and wherein the amount of (i) is from about 25 to about 94 parts of (i) and the amount of (ii) is from 6 to about 75 parts.

57. The coating composition of claim 51 wherein the non-pigmentary anti-corrosive agent is present in an amount varying from about 10 to about 50% by weight of the coating composition.

58. The coating composition of claim 51 wherein the amount of magnesium oxide is from about 20 to about 80% by weight and the amount of zinc oxide is from about 20 to about 80% by weight.

59. The conating composition of claim 51 wherein the amount of magnesium oxide is from about 50 to about 70% by weight and the amount of zinc oxide is from about 30 to about 50% by weight.

60. The coating composition of claim 51 wherein from about 10 to about 25% by weight of the non-pigmentary anti-corrosive agent is substituted with at least one compound formed from a divalent, trivalent or tetravalent metal cation and an anion selected from phosphates, phosphites, borates, borophosphates, borophosphites and mixtures thereof.

61. The coating composition of claim 60 wherein the compound is selected from the group consisting of calcium phosphate, calcium borate, calcium phosphite, zinc phosphite, zinc phosphate, zinc borate, magnesium phosphite and mixtures thereof.

62. The coating composition of claim 61 wherein the compound is crystalline calcium phosphite.

63. The coating composition of claim 51 wherein the coating composition further comprises from about 1 to about 69% by weight of a filler wherein the total amount of non-pigmentary anti-corrosive agent and filler is less than 70% by weight of the coating composition.

64. The coating composition of claim 63 wherein the filler is selected from the group consisting of talc, silica, barium sulfate, calcium sulfate, calcium carbonate, calcium silicate, titanium dioxide, iron oxides, mica, aluminum silicate, clay and mixtures thereof.

65. The coating composition of claim 64 wherein the filler is calcium carbonate.

66. The coating composition of claim 51 wherein from about 1 to about 10% by weight of the non-pigmentary anti-corrosive agent is substituted with an uncalcined compound selected from the group consisting of molybdenum trioxide, strontium oxide, barium oxide, calcium oxide and mixtures thereof.

* * * * *